US009501217B2

(12) United States Patent
Louch (10) Patent No.: US 9,501,217 B2
(45) Date of Patent: Nov. 22, 2016

(54) TARGET REGION FOR REMOVING ICONS FROM DOCK

(75) Inventor: John O. Louch, San Luis Obispo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/112,459

(22) Filed: May 20, 2011

(65) Prior Publication Data

US 2012/0185789 A1 Jul. 19, 2012

Related U.S. Application Data

(60) Provisional application No. 61/433,199, filed on Jan. 14, 2011.

(51) Int. Cl.
*G06F 3/0488* (2013.01)
*G06F 3/0482* (2013.01)
*G06F 3/0486* (2013.01)
*G06F 3/0481* (2013.01)
*G06F 3/0484* (2013.01)

(52) U.S. Cl.
CPC ........... *G06F 3/0488* (2013.01); *G06F 3/0482* (2013.01); *G06F 3/0486* (2013.01); *G06F 3/04817* (2013.01); *G06F 3/0481* (2013.01); *G06F 3/04842* (2013.01)

(58) Field of Classification Search
CPC ................. G06F 3/0486; G06F 3/0481; G06F 3/04817; G06F 3/04842; G06F 3/0488; Y10S 715/977
USPC .................................................. 715/769, 779
See application file for complete search history.

(56) References Cited

U.S. PATENT DOCUMENTS

| 5,483,261 | A | | 1/1996 | Yasutake |
| 5,488,204 | A | | 1/1996 | Mead et al. |
| 5,745,096 | A | | 4/1998 | Ludolph et al. |
| 5,745,111 | A | * | 4/1998 | Cline et al. ................... 715/769 |
| 5,757,371 | A | | 5/1998 | Oran et al. |

(Continued)

FOREIGN PATENT DOCUMENTS

| JP | 2000-163031 A | 6/2000 |
| JP | 2002-342033 A | 11/2002 |

OTHER PUBLICATIONS

Switchtoamac, "Remove Items from the Dock" (Dec. 24, 2008) p. 1-2, [retrieved from http://switchtoamac.com/guides/mac-os-x/dock/remove-items-from-the-dock.html].*

(Continued)

*Primary Examiner* — Ajay Bhatia
*Assistant Examiner* — Mong-Shune Chung
(74) *Attorney, Agent, or Firm* — Morrison & Foerster LLP (57) ABSTRACT

Providing a mechanism for removal of icons from a dock in response to user input is disclosed. A dock is generated for display in a user interface, the dock comprising a region of the user interface in which one or more icons are presented. An input is received for selecting an icon presented in the dock, the icon associated with an original position in the user interface. A visual indicator of a particular distance to drag the icon before the icon will be removed from the dock is generated for display. A second input for releasing the icon at a second position in the user interface is received. The icon is removed from the dock if a distance between the second position and the original position is within a predefined range of the particular distance.

17 Claims, 11 Drawing Sheets

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,835,919 A * | 11/1998 | Stern et al. | 715/209 |
| 5,874,958 A | 2/1999 | Ludolph | |
| 5,880,411 A | 3/1999 | Gillespie et al. | |
| 5,914,716 A | 6/1999 | Rubin et al. | |
| 6,108,003 A | 8/2000 | Hall, Jr. et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,337,698 B1 | 1/2002 | Keely, Jr. et al. | |
| 6,392,675 B1 | 5/2002 | Becker et al. | |
| 6,396,519 B1 | 5/2002 | Hall, Jr. et al. | |
| 6,448,986 B1 | 9/2002 | Smith | |
| 6,559,873 B1 | 5/2003 | Dawkins et al. | |
| 6,664,983 B2 | 12/2003 | Ludolph | |
| 6,690,387 B2 | 2/2004 | Zimmerman et al. | |
| 6,867,790 B1 * | 3/2005 | Brooks | 715/856 |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 7,770,120 B2 | 8/2010 | Baudisch | |
| 8,479,122 B2 | 7/2013 | Hotelling et al. | |
| 2002/0015064 A1 | 2/2002 | Robotham et al. | |
| 2002/0130838 A1 | 9/2002 | Feierbach | |
| 2002/0188619 A1 | 12/2002 | Low | |
| 2003/0146927 A1 * | 8/2003 | Crow | G06F 3/048 715/716 |
| 2005/0039147 A1 | 2/2005 | Ludolph et al. | |
| 2006/0010394 A1 | 1/2006 | Chaudhri et al. | |
| 2006/0026521 A1 | 2/2006 | Hotelling et al. | |
| 2006/0197753 A1 | 9/2006 | Hotelling | |
| 2007/0200713 A1 | 8/2007 | Weber et al. | |
| 2007/0240074 A1 | 10/2007 | Banks | |
| 2007/0250511 A1 * | 10/2007 | Endler et al. | 707/10 |
| 2007/0288860 A1 * | 12/2007 | Ording et al. | 715/779 |
| 2008/0187248 A1 | 8/2008 | Ikeda et al. | |
| 2009/0313567 A1 * | 12/2009 | Kwon et al. | 715/769 |
| 2009/0327955 A1 | 12/2009 | Mouilleseaux et al. | |
| 2010/0199208 A1 | 8/2010 | Tokunaga et al. | |
| 2010/0306692 A1 | 12/2010 | Baier et al. | |
| 2011/0087981 A1 * | 4/2011 | Jeong et al. | 715/769 |
| 2011/0246918 A1 * | 10/2011 | Henderson | 715/769 |
| 2011/0279354 A1 | 11/2011 | Tang et al. | |
| 2012/0185805 A1 | 7/2012 | Louch et al. | |

OTHER PUBLICATIONS

Thinkmacs, "Mac OS X Tutorial: Adding Icons to the Dock" (Sep. 20, 2010), [retrieved on Jul. 1, 2013], [retrieved from the Internet URL: <http://youtu.be/-PTItCAgzEM/>], p. 1-2.*

Switchtoamac, "Remove items from the Dock", (Feb. 27, 2009), <URL http://switchtoamac.com/guides/mac-os-x/dock/remove-items-from-the-dock.html/>, p. 1-2.*

Carr, D.A. et al. (Sep. 1994). "Using Interaction Object Graphs to Specifiy Graphical Widgets," *Institute for Systems Research*, University of Maryland, College Park, MD, 32 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action mailed Oct. 15, 2013, U.S. Appl. No. 13/165,860, filed Jun. 22, 2011, 11 pages.

Non-Final Office Action mailed Mar. 15, 2013, U.S. Appl. No. 13/165,860, filed Jun. 22, 2011, 11 pages.

Final Office Action mailed May 21, 2015, for U.S. Appl. No. 13/165,860, filed Jun. 22, 2011, 16 pages.

Non-Final Office Action mailed Sep. 2, 2014, for U.S. Appl. No. 13/165,860, filed Jun. 22, 2011, 13 pages.

* cited by examiner

TARGET REGION FOR REMOVING ICONS FROM DOCK

CROSS-REFERENCE TO RELATED APPLICATIONS

This application claims priority to U.S. Provisional Application No. 61/433,199, filed on Jan. 14, 2011, entitled "Target Region for Removing Icons from Dock," the entire contents of which is incorporated by reference.

TECHNICAL FIELD

This disclosure relates generally to generating for display a target region for removing icons from a dock in a computing device.

BACKGROUND

Modern graphical user interfaces present graphical objects or items displayed on a screen to allow users to interact with various applications. Leading personal computer operating systems, such as Apple Mac OS®, provide user interfaces in which a dock is displayed in the user interface for access to applications and system resources. The dock can be any graphical object, such as a taskbar, menu, virtual button or other user interface element that allows a user to link to applications by viewing and selecting icons representing the applications. In addition to application icons, the dock can also include other graphical items that provide information or resources to a user, such as visual indicators of the status of various system components or other visual elements associated with different applications.

In some instances, the user can configure the location, appearance, content, and settings of the dock. For example, the user may decide to add, rearrange, or remove icons displayed in the dock. Different mechanisms can be provided by the operating system to allow the user to configure icons in the dock. In certain instances, the user can select an icon using a pointer to move the icon to a different location or remove the icon from the dock entirely. The movement of the pointer can be controlled by the user inputting commands using an input device such as a mouse, touchpad, keyboard, or multi-touch input device. The user can select a particular icon with the pointer and drag the icon to a different location on the dock. In some implementations, the user can also select the icon and move the icon off the dock by dragging the icon off the dock to a different region of the user interface.

The drag and drop operations used to rearrange and move icons in the dock can consist of a user's selection of graphical items through an input device. The selection of graphical items can be triggered in response to a user's manual input, such as the user depressing a button or region of a touch screen or multi-touch input device. In some instances, however, a user can accidentally select a particular icon or unintentionally drop an icon in an undesired area. The unintentional user inputs can trigger unwanted actions or disrupt other tasks performed by the user. For example, in some instances, dragging an icon away from the dock and releasing the icon in an area of the user interface other than the dock can automatically remove the icon from the dock. Instead of removing the icon from the dock, however, the user may have intended to link to an application represented by the icon or to access a different graphical object in the vicinity of the icon.

SUMMARY

In a first general aspect, a method for providing a mechanism for removal of icons from a dock in response to user input is disclosed. A dock is generated for display in a user interface, the dock comprising a region of the user interface in which one or more icons are presented. An input is received for selecting an icon presented in the dock, the icon associated with an original position in the user interface. A visual indicator of a particular distance to drag the icon before the icon will be removed from the dock is generated for display. A second input for releasing the icon at a second position in the user interface is received. The icon is removed from the dock if a distance between the second position and the original position is within a predefined range of the particular distance.

Implementations can include any or all of the following features. The icon is returned to the dock if the distance between the second position and the original position is not within the predefined range of the particular distance. Generating the visual indicator for display includes generating for display a target region of the user interface in which to drop the icon in order to remove the icon from the dock. The target region of the user interface is represented by a trash can icon. The particular distance to drag the icon is defined by a virtual boundary, and the icon is removed from the dock if the icon is dragged across the virtual boundary. Receiving the first input includes receiving an input for dragging the icon at an initial rate of movement. The movement of the icon is displayed at a rate of movement slower than the initial rate of movement within a predefined area surrounding the original location of the icon and movement of the icon is displayed at the initial rate of movement if the icon is dragged outside the predefined area. Dragging the icon is associated with displaying movement of the icon from the original position along a trajectory corresponding to a path traversed by a pointer in the user interface. A visual appearance of the icon while the icon is being dragged by the pointer is altered. The visual appearance of the icon is returned to an original appearance of the icon if the icon is returned to the original position.

In a second general aspect, a computer program product is tangibly embodied in a computer-readable storage medium and includes instructions that, when executed, provide a mechanism for removal of icons from a dock in response to user input and perform the following operations. A dock is generated for display in a user interface, the dock comprising a region of the user interface in which one or more icons are presented. An input is received for selecting an icon presented in the dock, the icon associated with an original position in the user interface. A visual indicator of a particular distance to drag the icon before the icon will be removed from the dock is generated for display. A second input for releasing the icon at a second position in the user interface is received. The icon is removed from the dock if a distance between the second position and the original position is within a predefined range of the particular distance.

Implementations can include any or all of the following features. The icon is returned to the dock if the distance between the second position and the original position is not within the predefined range of the particular distance. Generating the visual indicator for display includes generating for display a target region of the user interface in which to drop the icon in order to remove the icon from the dock. The target region of the user interface is represented by a trash can icon. The particular distance to drag the icon is defined by a virtual boundary, and the icon is removed from the dock if the icon is dragged across the virtual boundary. Receiving the first input includes receiving an input for dragging the icon at an initial rate of movement. The movement of the icon is displayed at a rate of movement slower than the initial rate of movement within a predefined area surrounding the original location of the icon and movement of the icon is displayed at the initial rate of movement if the icon is dragged outside the predefined area. Dragging the icon is associated with displaying movement of the icon from the original position along a trajectory corresponding to a path traversed by a pointer in the user interface. A visual appearance of the icon while the icon is being dragged by the pointer is altered. The visual appearance of the icon is returned to an original appearance of the icon if the icon is returned to the original position.

The details of one or more implementations of managing items in a user interface are set forth in the accompanying drawings and the description below. Other features, aspects, and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
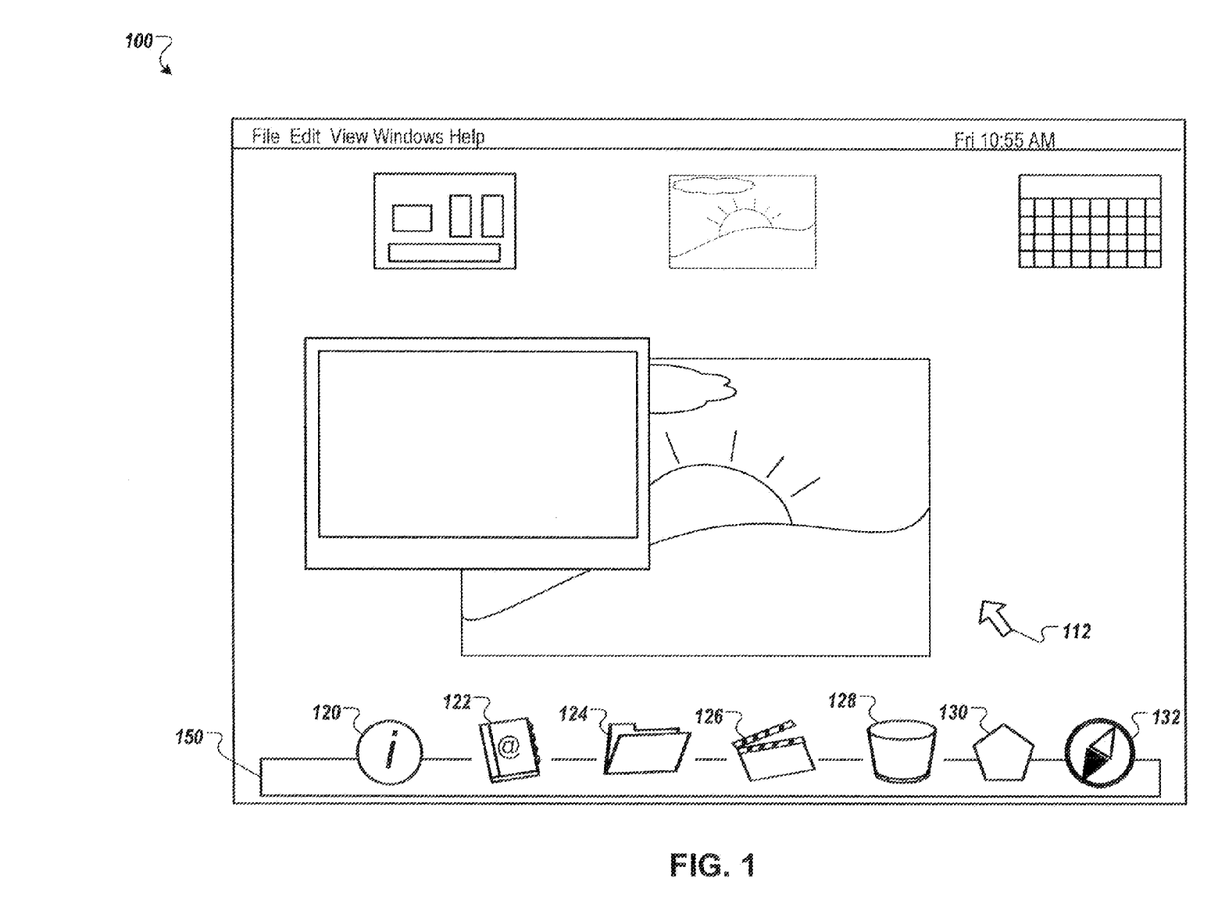
FIG. 1 illustrates an exemplary user interface showing a desktop environment with a dock.

Exemplary User Interfaces for Presenting Visual Indicator of a Region for Removing Icons FIG. 1 illustrates an exemplary user interface 100, which can be a desktop of an operating system. The user interface 100 can also include a docking element 150, or dock, which provides an area where commonly used or preferred applications can be easily accessed through selection of icons included in the docking element 150, each icon associated with a different application. The dock 150 can be located in any region of the user interface, although in some instances, the dock 150 is generated for display at the edge of the visible area of a user interface, such as at the bottom of the screen as depicted in FIG. 1. The location of the dock 150 can also be changed based on user preferences or automatically in response to the context in which the dock 150 is presented.

In the illustrated example, icons (120, 122, 124, 126, 128, 130, 132) are generated for display in the dock 150, and each icon corresponds to a shortcut to a particular application. The icons in the dock can be moved around, rearranged, deleted, modified, and recreated. Various features can be included with the dock 150 to facilitate user navigation of icons contained in the dock or to enhance the utility and presentation of the dock 150. For example, in some implementations, the icons in the dock 150 can be visually altered based on movement and/or location of the pointer 112. As the pointer 112 hovers over a particular icon, for example, the icon can be enlarged, brightened, animated, or visually enhanced with respect to the other icons in the dock 150 to indicate to the user which icon would be selected if the user enters an appropriate input. Further, when multiple icons are contained in the dock 150, the dock 150 may not have space to display each icon. As the pointer 112 moves across the icons presented in the dock 150, the icons can shift to the left or right as necessary to create the effect of scrolling through the available icons in the dock 150.

In some instances, icons in the dock 150 can be automatically removed from the dock in response to certain user inputs. For example, the icons in the dock 150 can be removed from the dock in response to a user's selection of the icon, dragging the icon away from the dock, and dropping the icon in a region of the desktop apart from the dock 150. The automatic removal of icons from the dock 150 in response to the user's drag and drop operations, however, can in certain instances disrupt the user's interactions with the desktop environment. For example, the user may need to access a graphical object in close proximity to a particular icon. Accordingly, the user may accidentally select the icon instead of the graphical object and remove the icon from the dock 150. The user may also intend to open an application represented by an icon, but instead drag and drop the icon onto the desktop, triggering removal of the icon from the dock 150. Accordingly, various indicators can be presented to a user to inform the user of a region or "drop zone" in which dropping of icons from the dock will remove the icons from the dock. Different indicators can also be displayed to inform the user that an icon has been selected in order to minimize accidental selections of icons.

Exemplary Actions for Providing Indicators for Removing Objects from a Dock

Figure 2A:
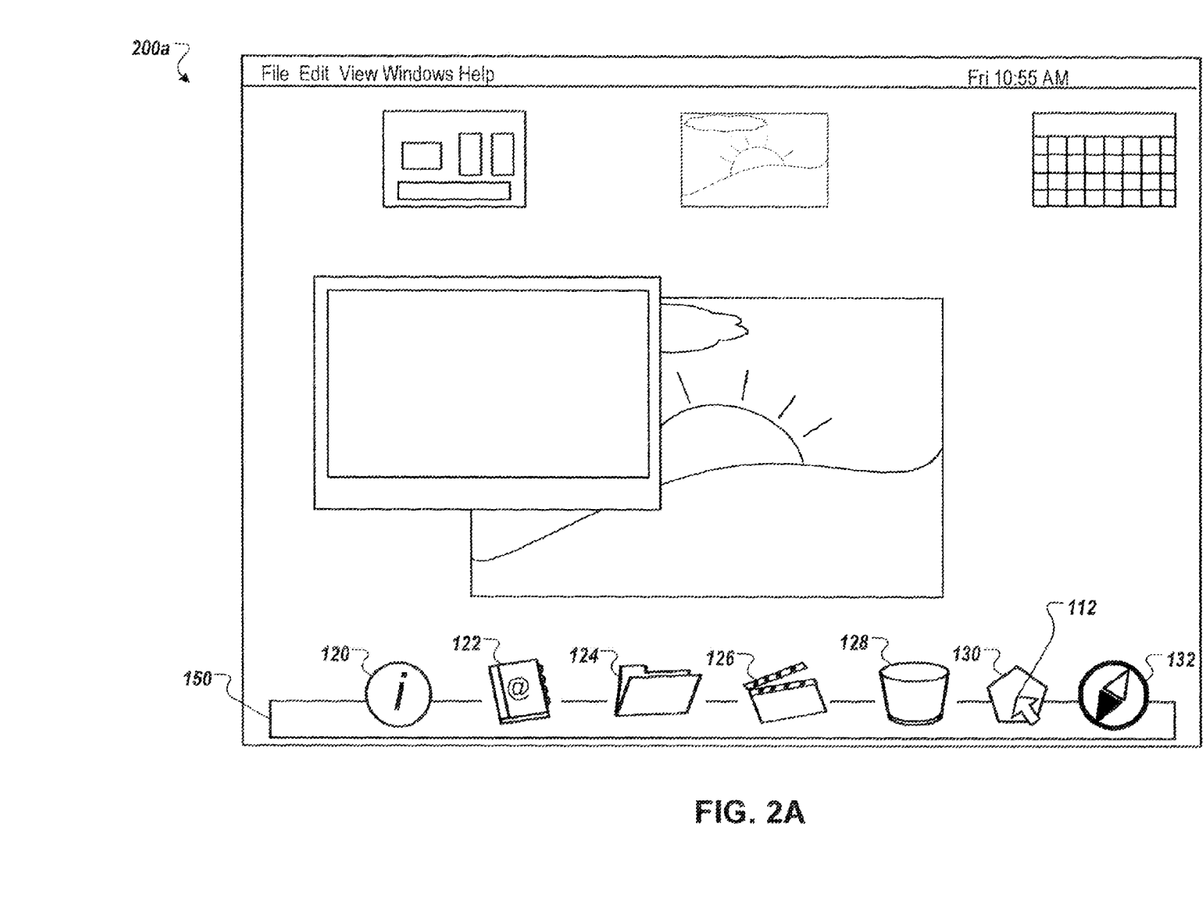
FIG. 2A illustrates an exemplary user interface showing selection of an icon in the dock.
Figure 2B:
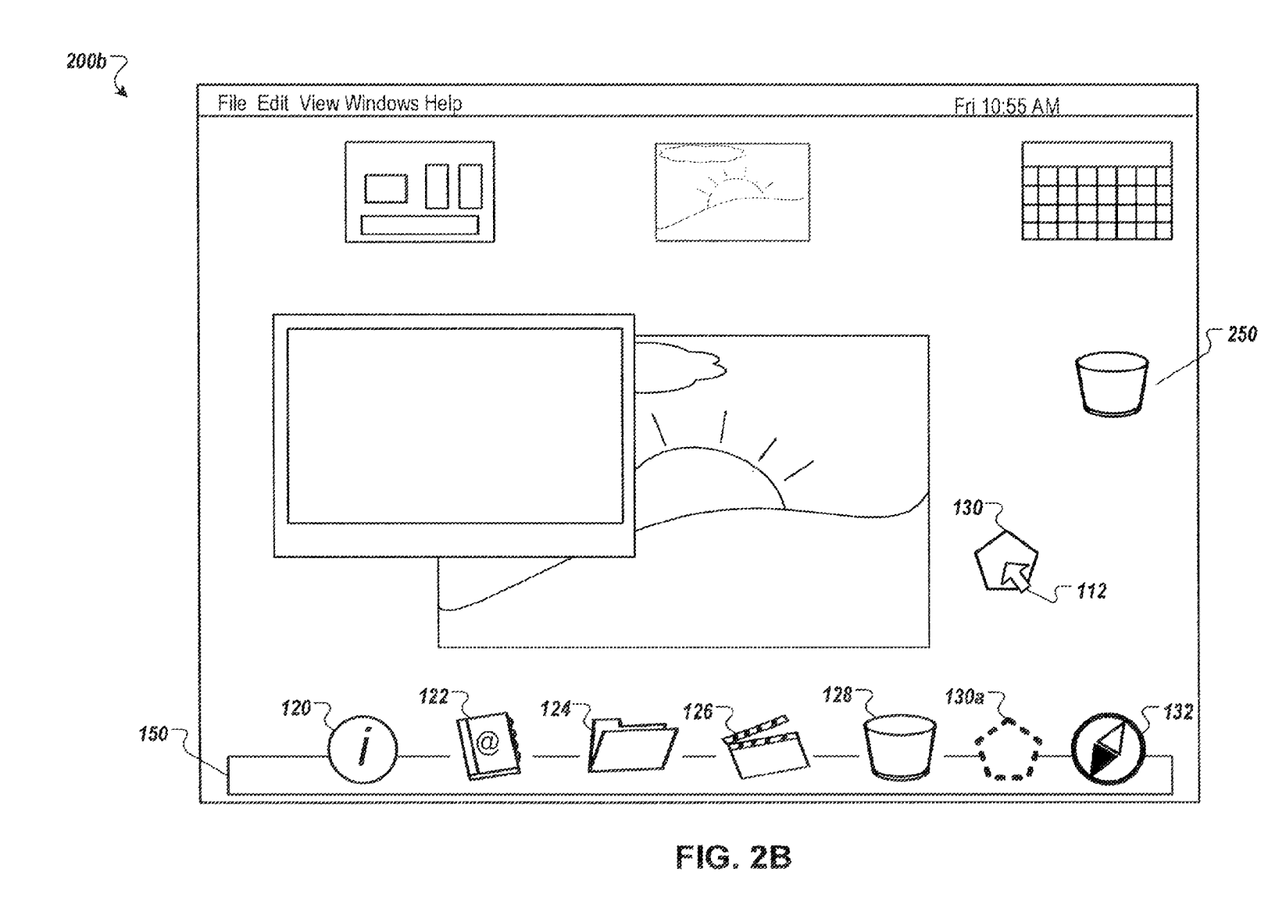
FIG. 2B illustrates an exemplary user interface showing dragging of the icon from the dock and display of a visual indicator of a region to drop the icon.
Figure 2C:
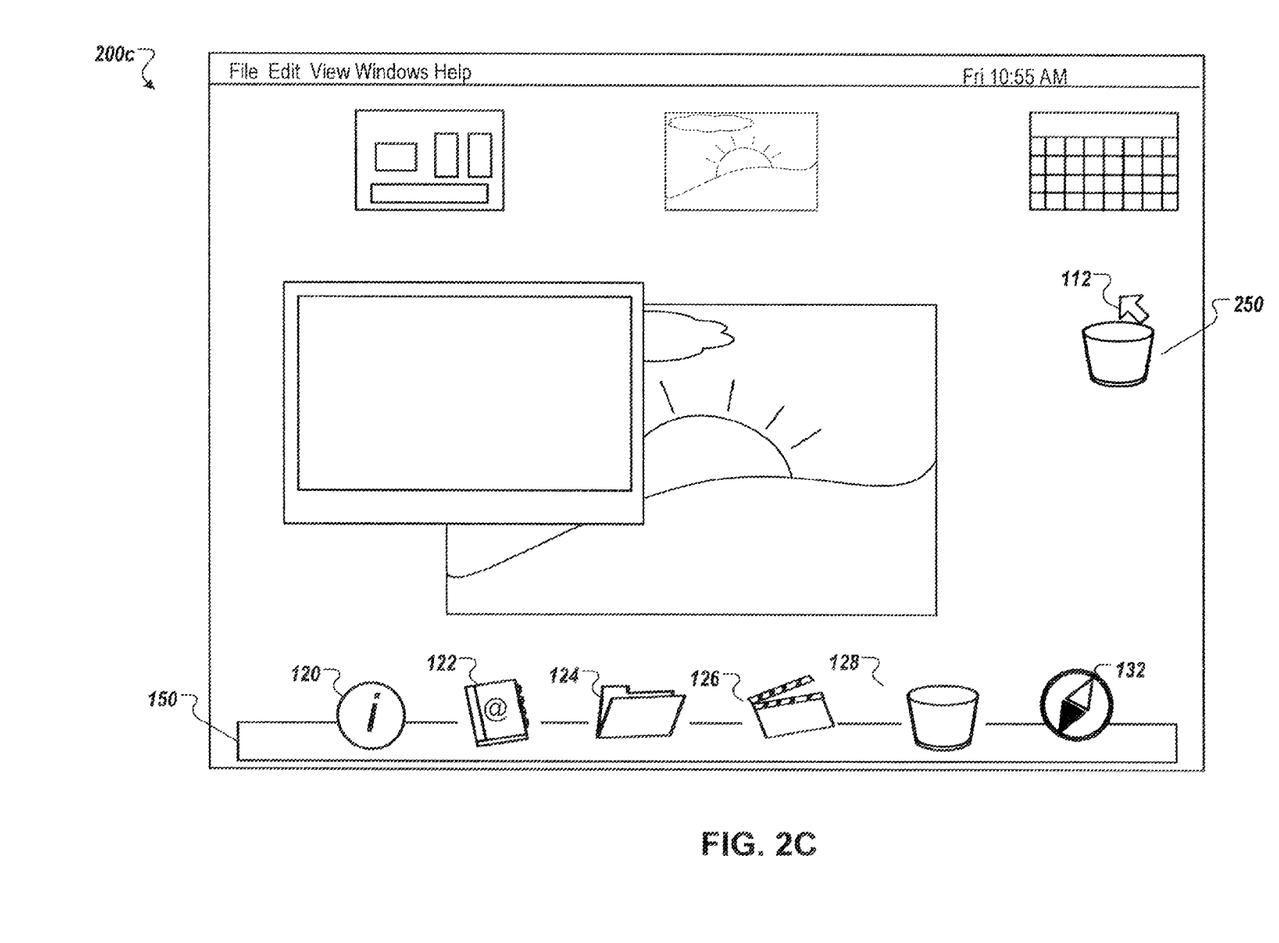
FIG. 2C illustrates an exemplary user interface showing removal of the icon from the dock after dropping the icon in the region.

FIGS. 2A-2C illustrate example screenshots 200*a*, 200*b*, and 200*c* of actions performed that can trigger indicators for removing objects from a dock. As illustrated in FIG. 2A, a dock 150 containing icons (120, 122, 124, 126, 128, 130, 132) is displayed in a user interface. A user can select a particular icon 130 using a pointer 112. The selection of the icon 130 can be associated with a drag and drop operation, wherein the icon 130 is selected based on a first input from the user, and after movement of the icon 130 to a different location, the icon 130 is released based on a second input from the user. As the user selects the icon 130 and begins a dragging motion of the icon 130 away from the dock 150, a visual indicator 250 can be generated for display in the user interface to signal a region in which to drop the selected icon 130 to remove the icon 130 from the dock 150. As depicted in FIG. 2B, the visual indicator 250 presented can be a trash can icon 250 or some other graphical object informing the user of the region in which to drop the icon 130. Further, a visual element 130a can be presented in the dock 150 as a placeholder for the original position of the icon 130. The placeholder visual element 130a can correspond to a shape of the icon 130 to indicate that the original position of the icon 130 is maintained in case the user wishes to return the icon 130 to the dock 150.

FIG. 2C illustrates a screenshot 200c of the dropping of the icon 130 in the region designated for removing icons. As seen in FIG. 2C, the user can drag the icon 130 to the trash can icon 250 displayed in the user interface and release the icon 130 as the pointer 112 moves over the trash can icon 250. After the icon 130 is dropped "into" the trash can icon 250, removal of the icon 130 from the dock 150 is finalized, and the placeholder element 130a is removed from the dock 150. The surrounding icons in the dock can be shifted accordingly in view of the removal of the icon 130. If the user does not drag the icon 130 to the trash can icon 250 and releases the icon 130 in any other region of the user interface apart from the trash can icon 250, the icon 130 can be returned to the dock 150, restoring the dock 150 to its original appearance as depicted in FIG. 2A. Accordingly, as the user selects an icon, a visual indicator is provided to inform the user that the user may remove the icon from the dock by dropping the icon in a particular region of the desktop or return the icon to the dock by releasing the icon in any area other than the particular region designated for removal of icons.

Exemplary Visual Indicators for Removing Icons from a Dock

Figure 3A:
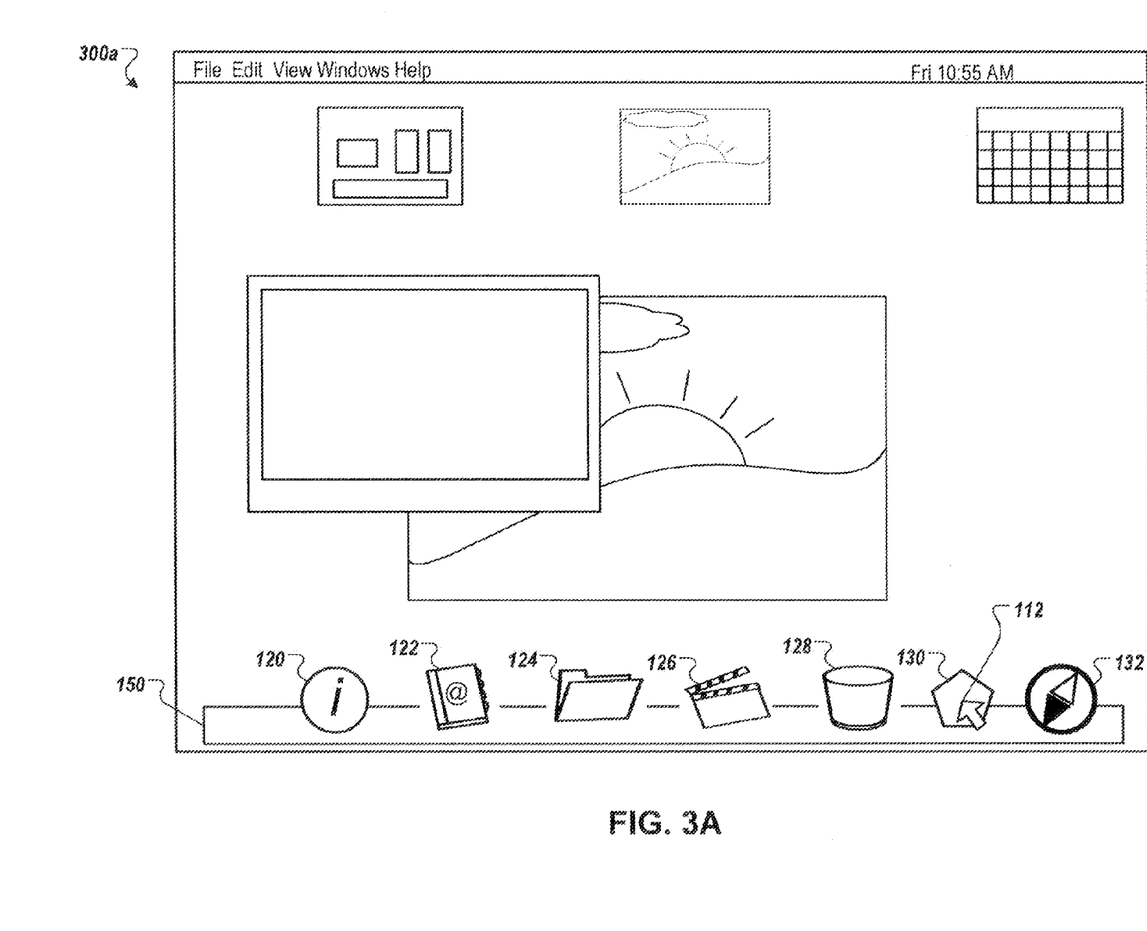
FIGS. 3A-3B illustrate an exemplary user interface showing a visual indicator that an icon from the dock has been selected.
Figure 3B:
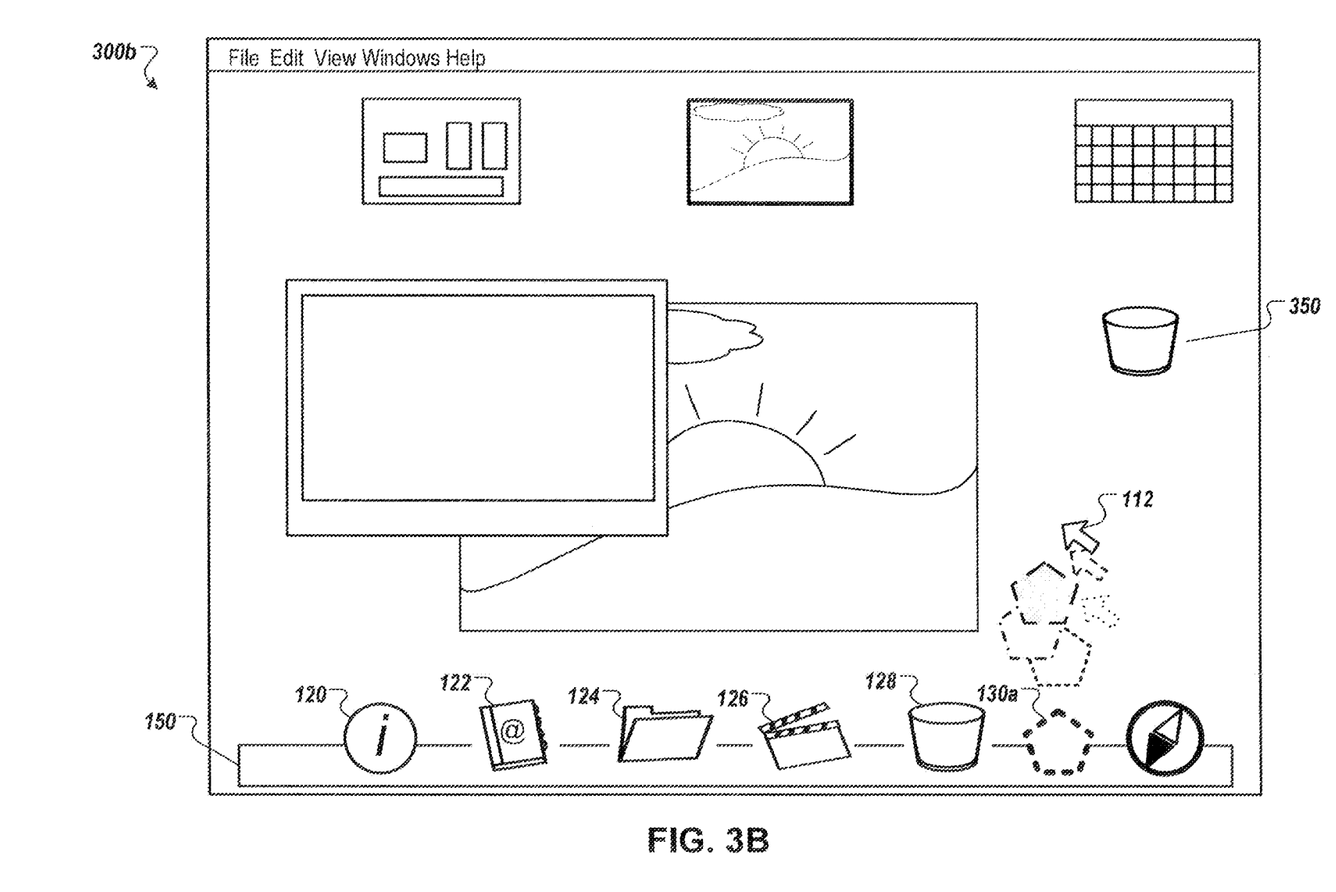

FIGS. 3A-3B illustrate example screenshots 300a and 300b of visual indicators generated for display in the user interface during removal of icons from a dock. The visual indicators can be presented in order to inform a user that an icon has been selected or to prevent accidental removal of icons from the dock. As illustrated in FIG. 3A, a user can select a particular icon 130 in the dock 150 using a pointer 112. As the user inputs a command to drag the icon 130 away from the dock 150, a visual indicator is presented to show that the user has selected the icon 130. In FIG. 3B, the visual indicator is a visual trail following the pointer 112 and the icon 130 as the pointer 112 drags the icon 130 away from the dock 150. Accordingly, in addition to the appearance of the trash can icon 350 in the user interface, the visual trail also is depicted to notify the user that the icon 130 has been selected and can be removed from the dock 150 if dragged to the trash can icon 350.

Further, other forms of indicators can also be used to notify the user of selection of an icon and possible removal of the icon from the dock 150. For example, the velocity of a pointer's movement can be reduced as the user selects an icon using the pointer 112 to give the impression of "resistance" against movement of the pointer 112. In particular, the user may input a level of velocity for moving the pointer 112 throughout the user interface. As a particular icon in the dock is selected by the user, however, the visual display of the movement of the pointer 112 can be automatically slowed or stopped completely despite a received input for movement of the pointer 112 at a particular velocity from the user. Accordingly, the effect of "resistance" on the pointer 112 can be achieved by slowing down the velocity of the pointer 112 relative to the input velocity.

Exemplary Actions for Removing Icons from a Dock

Figure 4:
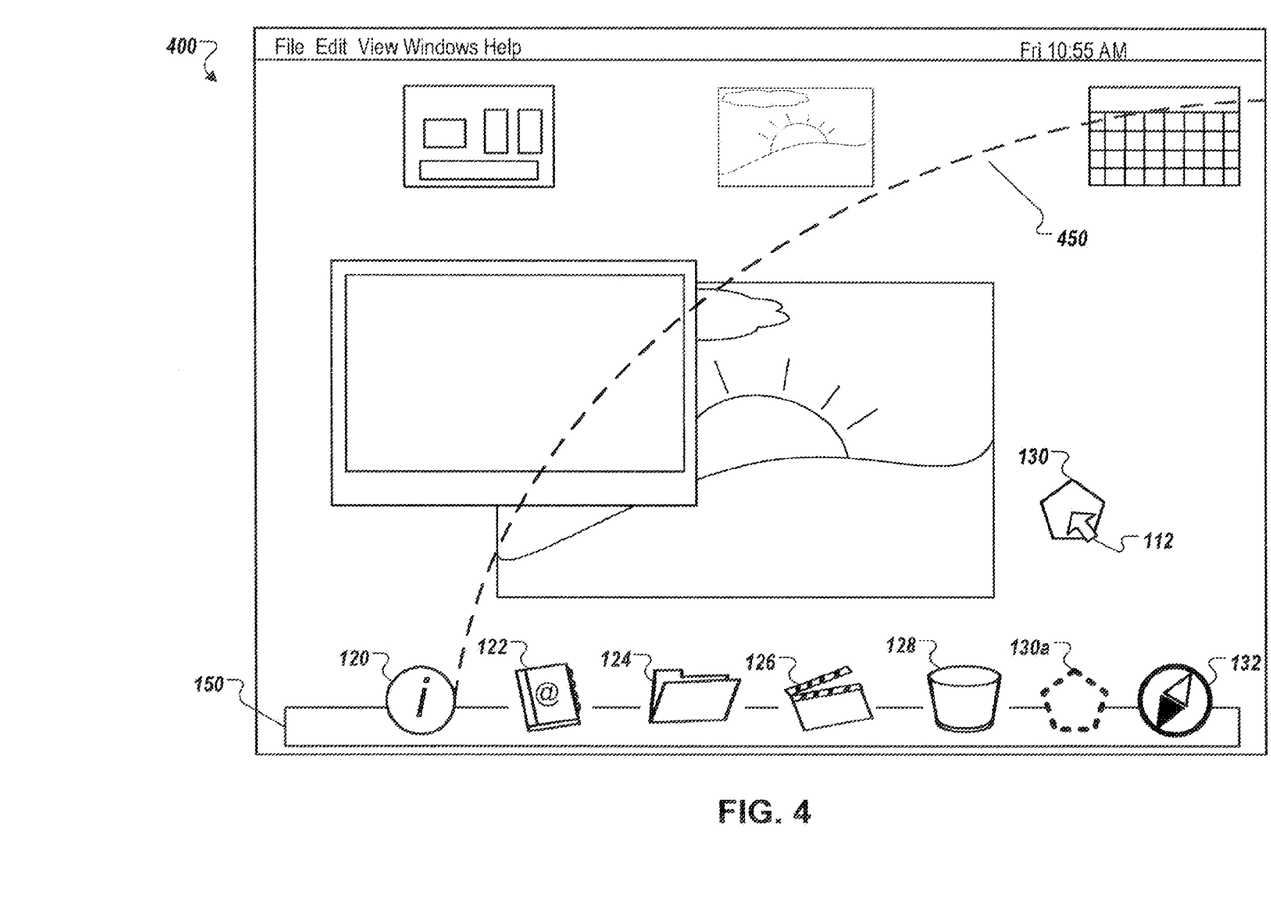
FIG. 4 illustrates an exemplary user interface showing a virtual boundary representing a distance to drag an icon for removing the icon from the dock.

FIG. 4 illustrates another example screenshot 400 of actions performed during removal of an icon from a dock. In some implementations, instead of presenting a single, specific area in which an icon is dropped in order to remove the icon from the user interface, a general region can be used as an area in which icons are to be dropped in order to remove the icons from a dock. Further, a virtual boundary can be used to define the general region in which icons are to be dropped. In some instances, the location of the virtual boundary in the user interface can correspond to a minimum distance that an icon needs to be dragged and dropped in order to remove the icon from the dock. As depicted in FIG. 4, a user's selection of an icon 130 and dragging of the icon 130 away from the dock 150 can trigger activation of a virtual boundary 450. The virtual boundary 450 can define a minimum distance that the icon 130 must be dragged before dropping the icon 130 will trigger removal of the icon 130 from the dock 150. The minimum distance can, in some instances, vary dynamically depending on the particular icon selected or a context of the user. Further, the minimum distance can be determined based on a certain distance sufficient to minimize accidental removal of icons from the dock 150. In the illustrated example, if the user crosses the virtual boundary 450 with the pointer 112 and the icon 130 before dropping the icon 130 on the desktop, the icon 130 will be removed from the dock 150. If the user drops the icon 130 before crossing the virtual boundary 450, the icon 130 is returned to the dock 150.

Further, although the virtual boundary 450 is depicted in FIG. 4 as a "virtual" boundary that may not be visible to the user, the virtual boundary 450 can also be visibly displayed in the user interface in some implementations. Different visual indicators associated with the virtual boundary 450 can be displayed. For example, a graphical depiction of the virtual boundary 450 can include highlighted pixels or a glowing effect surrounding the virtual boundary 450. Still further, the virtual boundary 450 can be a straight line or some other shape, such as a shape sufficient to circumscribe a particular region in the user interface. In some implementations, the virtual boundary 450 can also consist of an amorphous shape adaptable to correspond to the shape of a particular graphical object or region. The shape, form, or distance covered by the virtual boundary 450 can also be dynamically modified, either manually or automatically, based on the particular context associated with a particular operating system, application, scenario, or user.

Exemplary Processes for Displaying Visual Indicators for Removing Icons

Figure 5:
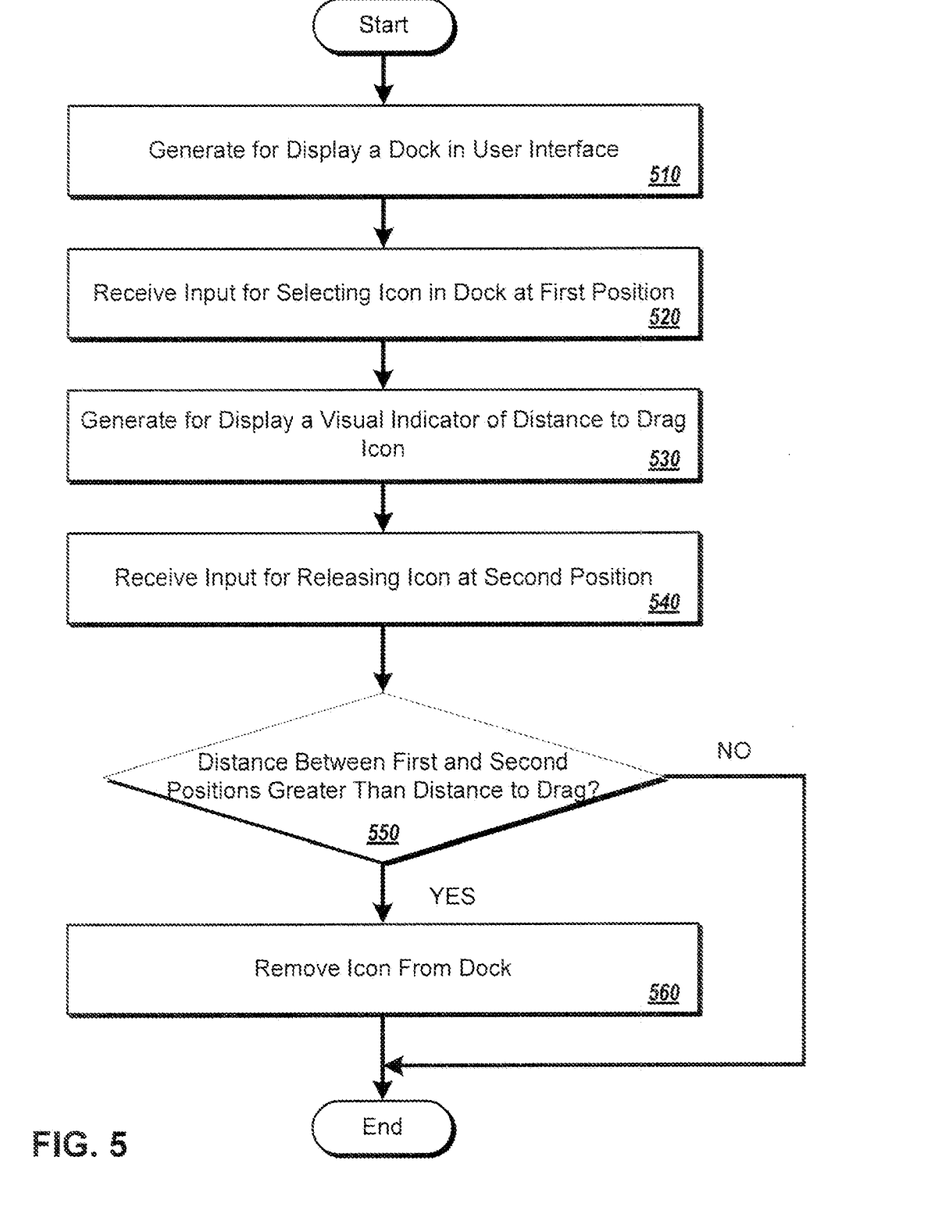
FIG. 5 is a flow diagram of an exemplary process for removing an icon from a dock if the icon is dragged a minimum distance from the dock.

FIG. 5 is a flow diagram of an exemplary process 500 for displaying visual indicators for removing icons from a dock. In the exemplary process 500, a dock is generated for display in a user interface (510). An input is received for selecting a particular icon in the dock, the icon located at a first position (520). A visual indicator of the distance to drag the icon before the icon is removed from the dock is generated for display (530). An input is received for releasing the icon at the second position (540). A determination is made as to whether the distance between the first and second location is greater than the distance required to drag the icon before the icon is removed from the dock (550). If the distance between the first and second location is greater, the icon is removed from the dock (560).

Figure 6:
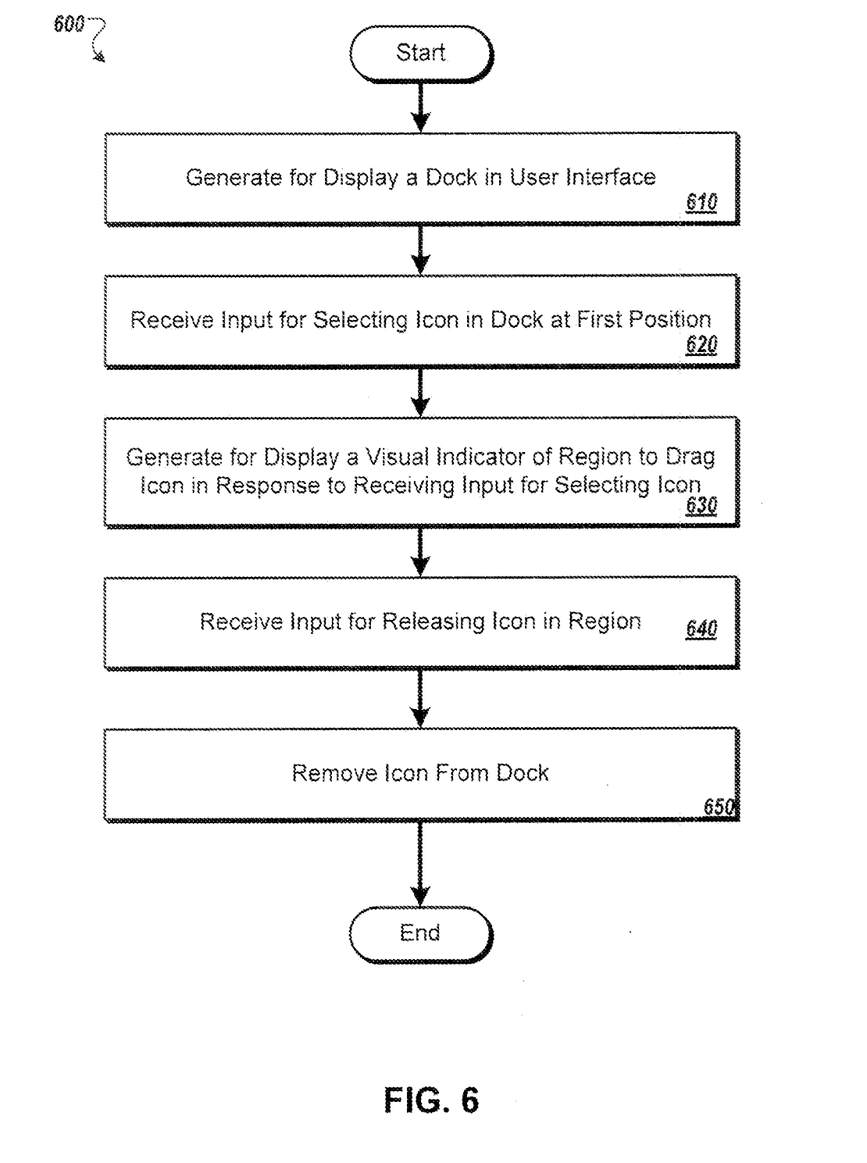
FIG. 6 is a flow diagram of an exemplary process for presenting a visual indicator of a region to drop an icon to remove the icon from the dock.

FIG. 6 is a flow diagram of an exemplary process 600 for displaying visual indicators for removing icons from a dock. In the exemplary process 600, a dock is generated for display in a user interface (610). An input is received for selecting a particular icon in the dock, the icon located at a first position (620). A visual indicator of the region to drag the icon to is generated for display in response to receiving the input for selecting the icon (630). An input is received in the region for releasing the icon (640), and the icon is removed from the dock (650).

Figure 7:
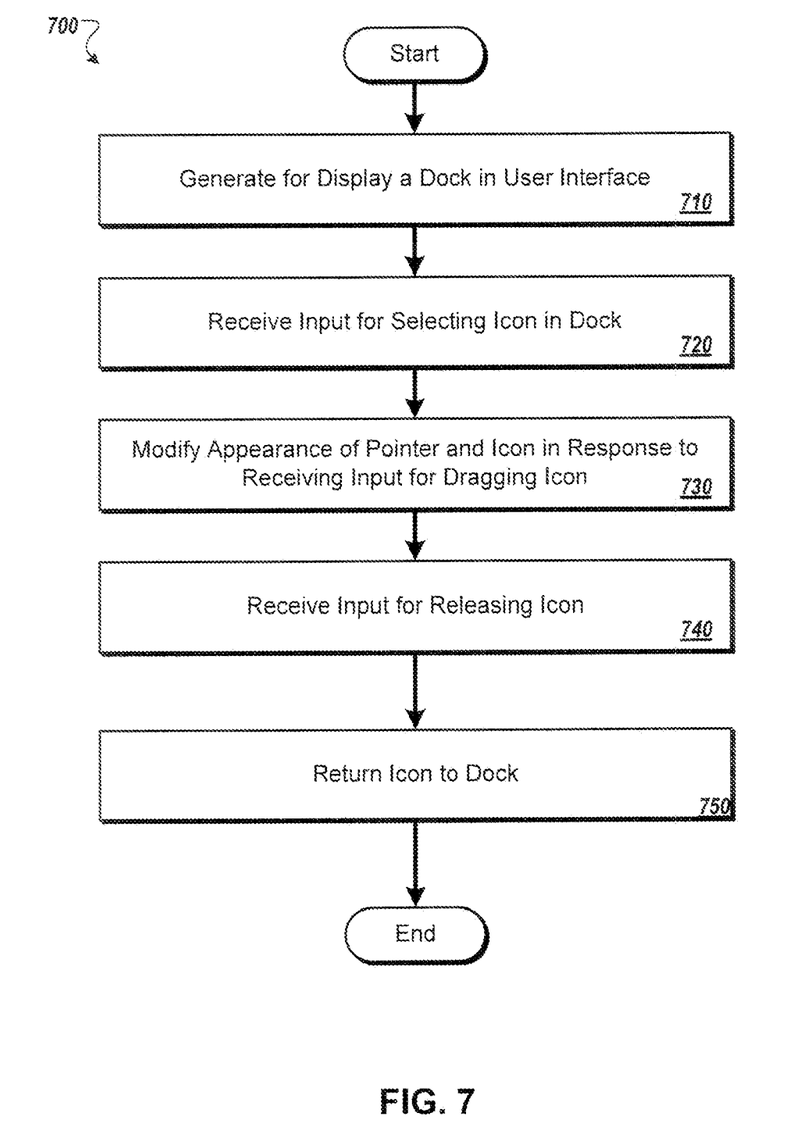
FIG. 7 is a flow diagram of an exemplary process for modifying an appearance of a pointer and a selected icon in response to dragging of the icon.

FIG. 7 is a flow diagram of an exemplary process 700 for displaying visual indicators of selection and dragging of an icon. In the exemplary process 700, a dock is generated for display in a user interface (710). An input is received for selecting a particular icon in the dock (720). The appearance of the pointer and icon are modified in response to receiving input for dragging the icon (730). An input is received for releasing the icon (740), and the icon is returned to the dock (750).

The above processes are merely examples. Various combinations of the above processes are possible.

Exemplary Device Architecture

Figure 8:
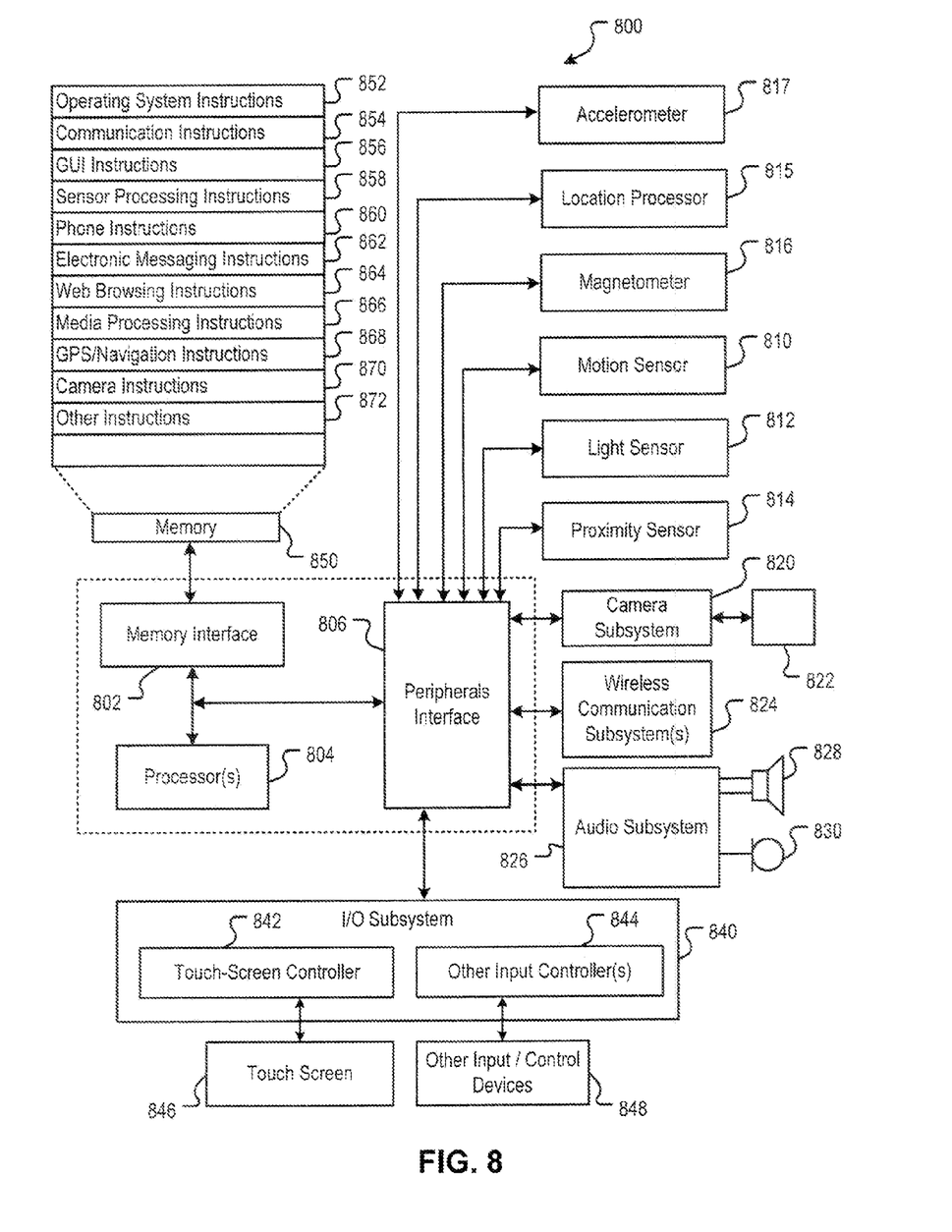
FIG. 8 is a block diagram of exemplary hardware architecture for implementing the user interfaces and processes described in reference to FIGS. 1-7.

FIG. 8 is a block diagram of exemplary hardware architecture 800 for a device implementing the bridge view of virtual workspaces processes and interfaces described in reference to FIGS. 1-7. The device can include memory interface 802, one or more data processors, image processors and/or processors 804, and peripherals interface 806. Memory interface 802, one or more processors 804 and/or peripherals interface 806 can be separate components or can be integrated in one or more integrated circuits. The various components in the device, for example, can be coupled by one or more communication buses or signal lines.

Sensors, devices, and subsystems can be coupled to peripherals interface 806 to facilitate multiple functionalities. For example, motion sensor 810, light sensor 812, and proximity sensor 814 can be coupled to peripherals interface 806 to facilitate orientation, lighting, and proximity functions of the mobile device. Location processor 815 (e.g., GPS receiver) can be connected to peripherals interface 806 to provide geopositioning. Electronic magnetometer 816 (e.g., an integrated circuit chip) can also be connected to peripherals interface 806 to provide data that can be used to determine the direction of magnetic North. Thus, electronic magnetometer 816 can be used as an electronic compass. Accelerometer 817 can also be connected to peripherals interface 806 to provide data that can be used to determine change of speed and direction of movement of the mobile device.

Camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which a mobile device is intended to operate. For example, a mobile device can include communication subsystems 824 designed to operate over a GSM network, a GPRS network, an EDGE network, a Wi-Fi or WiMax network, and a Bluetooth network. In particular, the wireless communication subsystems 824 can include hosting protocols such that the mobile device can be configured as a base station for other wireless devices.

Audio subsystem 826 can be coupled to a speaker 828 and a microphone 830 to facilitate voice-enabled functions, such as voice recognition, voice replication, digital recording, and telephony functions.

I/O subsystem 840 can include touch screen controller 842 and/or other input controller(s) 844. Touch-screen controller 842 can be coupled to a touch screen 846 or pad. Touch screen 846 and touch screen controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 846.

Other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In one implementation, a pressing of the button for a first duration may disengage a lock of the touch screen 846; and a pressing of the button for a second duration that is longer than the first duration may turn power to the device on or off. The user may be able to customize a functionality of one or more of the buttons. The touch screen 846 can, for example, also be used to implement virtual or soft buttons and/or a keyboard.

In some implementations, the device can present recorded audio and/or video files, such as MP3, AAC, and MPEG files. In some implementations, the device can include the functionality of an MP3 player, such as an iPod™. The device may, therefore, include a pin connector that is compatible with the iPod. Other input/output and control devices can also be used.

Memory interface 802 can be coupled to memory 850. Memory 850 can include high-speed random access memory and/or non-volatile memory, such as one or more magnetic disk storage devices, one or more optical storage devices, and/or flash memory (e.g., NAND, NOR). Memory 850 can store operating system 852, such as Darwin, RTXC, LINUX, UNIX, OS X, WINDOWS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers and/or one or more servers. Memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes and instructions; and camera instructions 870 to facilitate camera-related processes and functions. In particular, the graphical user interface instructions 856 can facilitate the user interface features described in reference to FIGS. 1-7. The memory 850 may also store other software instructions (not shown), such as security instructions, web video instructions to facilitate web video-related processes and functions, and/or web-shopping instructions to facilitate web shopping-related processes and functions. In some implementations, the media processing instructions 866 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 850. Memory 850 can also include other instructions 872.

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the mobile device may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard, a mouse or a trackball, or a pointing device (e.g., a finger or stylus on a touch-sensitive surface or touch-sensitive display) by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps as disclosed herein can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method performed by one or more processes executing on a computer system, the method comprising:
 displaying, on a display, a dock in a user interface, the dock comprising a region of the user interface in which one or more icons are presented, wherein the icons in the dock are displayed proximate to a first edge of the display;
 receiving a first input selecting an icon presented in the dock in order to drag the icon from the dock, the icon associated with an original position in the user interface;
 in response to receiving the first input for selecting the icon, displaying, on the display, a visual indicator of a removal target position, wherein the visual indicator of the removal target position is displayed proximate to a second edge of the display that is different from the first edge of the display, and the icons in the dock other than the selected icon continue being displayed proximate to the first edge of the display while the visual indicator of the removal target position is displayed proximate to the second edge of the display;
 receiving a second input releasing the icon at a second position in the user interface;
 determining whether the second position is within a predefined range of the removal target position;
 in accordance with a determination that the second position is within the predefined range of the removal target position, removing the icon from the display; and
 in accordance with a determination that the second position is not within the predefined range of the removal target position, presenting the icon in the dock.

2. The method of claim 1 wherein the removal target position is represented by a trash can icon.

3. The method of claim 1 wherein receiving the first input includes receiving an input for dragging the icon at an initial rate of movement.

4. The method of claim 3 further comprising displaying movement of the icon at a rate of movement slower than the initial rate of movement within a predefined area surrounding the original location of the icon and displaying movement of the icon at the initial rate of movement if the icon is dragged outside the predefined area.

5. The method of claim 1 wherein dragging the icon is associated with displaying movement of the icon from the original position along a trajectory corresponding to a path traversed by a pointer in the user interface.

6. The method of claim 5 further comprising altering a visual appearance of the icon while the icon is being dragged by the pointer.

7. The method of claim 6 further comprising returning the visual appearance of the icon to an original appearance of the icon if the icon is returned to the original position.

8. A computer program product tangibly embodied in a non-transitory computer-readable storage medium, the computer program product including instructions that, when executed, generate on a display device a graphical user interface for presenting graphical objects and perform the following operations:
 displaying, on a display, a dock in a user interface, the dock comprising a region of the user interface in which one or more icons are presented, wherein the icons in the dock are displayed proximate to a first edge of the display;
 receiving a first input selecting an icon presented in the dock in order to drag the icon from the dock, the icon associated with an original position in the user interface;
 in response to receiving the first input for selecting the icon, displaying, on the display, a visual indicator of a removal target position, wherein the visual indicator of the removal target position is displayed proximate to a second edge of the display that is different from the first edge of the display, and the icons in the dock other than the selected icon continue being displayed proximate to the first edge of the display while the visual indicator of the removal target position is displayed proximate to the second edge of the display;
 receiving a second input releasing the icon at a second position in the user interface;
 determining whether the second position is within a predefined range of the removal target position;
 in accordance with a determination that the second position is within the predefined range of the removal target position, removing the icon from the display; and
 in accordance with a determination that the second position is not within the predefined range of the removal target position, presenting the icon in the dock.

9. The computer program product of claim 8 wherein receiving the first input includes receiving an input for dragging the icon at an initial rate of movement.

10. The computer program product of claim 9, the instructions further performing displaying movement of the icon at a rate of movement slower than the initial rate of movement within a predefined area surrounding the original location of the icon and displaying movement of the icon at the initial rate of movement if the icon is dragged outside the predefined area.

11. A system comprising:
 a display device;
 a computing device in communication with the display device, wherein the computing device is configured to perform at least the following:
 display, on the display device, a dock in a user interface, the dock comprising a region of the user interface in which one or more icons are presented, wherein the icons in the dock are displayed proximate to a first edge of the display;
 receive a first input selecting an icon presented in the dock in order to drag the icon from the dock, the icon associated with an original position in the user interface;
 in response to receiving the first input for selecting the icon, display, on the display device, a visual indicator of a removal target position, wherein the visual indicator of the removal target position is displayed proximate to a second edge of the display that is different from the first edge of the display, and the icons in the dock other than the selected icon continue being displayed proximate to the first edge of the display while the visual indicator of the removal target position is displayed proximate to the second edge of the display;
 receive a second input releasing the icon at a second position in the user interface;
 determine whether the second position is within a predefined range of the removal target position;
 in accordance with a determination that the second position is within the predefined range of the removal target position, remove the icon from the display; and in accordance with a determination that the second position is not within the predefined range of the removal target position, present the icon in the dock.

12. The method of claim 1, the method further comprising:
further in accordance with the determination that the second position is within the predefined range of the removal target position, removing the visual indicator from the user interface.

13. The computer program product of claim 8, the instructions further performing:
further in accordance with the determination that the second position is within the predefined range of the removal target position, removing the visual indicator from the user interface.

14. The system of claim 11, the computing device further configured to perform:
further in accordance with the determination that the second position is within the predefined range of the removal target position, remove the visual indicator from the user interface.

15. The method of claim 1, the method further comprising:
after receiving at least a portion of the first input, displaying, on the display, a placeholder object on the dock that indicates a location of the icon in the dock prior to receiving the first input for selecting the icon.

16. The method of claim 15, wherein the icon has a first shape, and the placeholder object has a second shape, the same as the first shape.

17. The method of claim 15, wherein the placeholder object is displayed concurrently with the visual indicator of the removal target position.

* * * * *